United States Patent [19]

Hemphill

[11] 3,898,470

[45] Aug. 5, 1975

[54] SCANNING ARRANGEMENT FOR MULTI-FUNCTION OPERATION

[75] Inventor: Kent W. Hemphill, Rochester, N.Y.

[73] Assignee: Xerox Corporation, Stamford, Conn.

[22] Filed: Dec. 12, 1973

[21] Appl. No.: 423,955

[52] U.S. Cl. .................... 250/567; 178/7.6; 355/16

[51] Int. Cl. .......................................... G01n 21/30

[58] Field of Search ..... 178/7.6, DIG. 27, 11, 17 D; 346/139 A; 250/566, 567; 355/16, 43, 51

[56] References Cited

UNITED STATES PATENTS

| | | | |
|---|---|---|---|
| 3,287,736 | 11/1966 | Germer | 178/7.6 |
| 3,695,161 | 10/1972 | Mason | 354/292 |
| 3,707,601 | 12/1972 | Goble | 346/139 A |
| 3,729,248 | 4/1973 | Beduchaud | 178/7.6 |

*Primary Examiner*—James W. Lawrence
*Assistant Examiner*—D. C. Nelms

[57] ABSTRACT

An optical scanning arrangement for use in a multi-function machine capable of selectively scanning a document, in a facsimile transmitter mode, to generate an optical signal corresponding to information contained thereon and directing the signal to a photosensitive medium. In addition, the scanning arrangement may operate to scan, in a facsimile receiver mode, successive light pulses directed through an optical disc onto the photosensitive medium. The scanning arrangement comprises a plurality of lens-mirror combinations mounted on an endless belt. The lens-mirror combinations on the top run of the belt are used to scan a document in the facsimile transmitter mode, and the combination on the bottom run are arranged to scan the light pulses across the photosensitive medium. Additionally, there is provided a copy lens arrangement of conventional design for scanning, in a copier mode, a document a line at a time onto the photosensitive medium.

3 Claims, 1 Drawing Figure

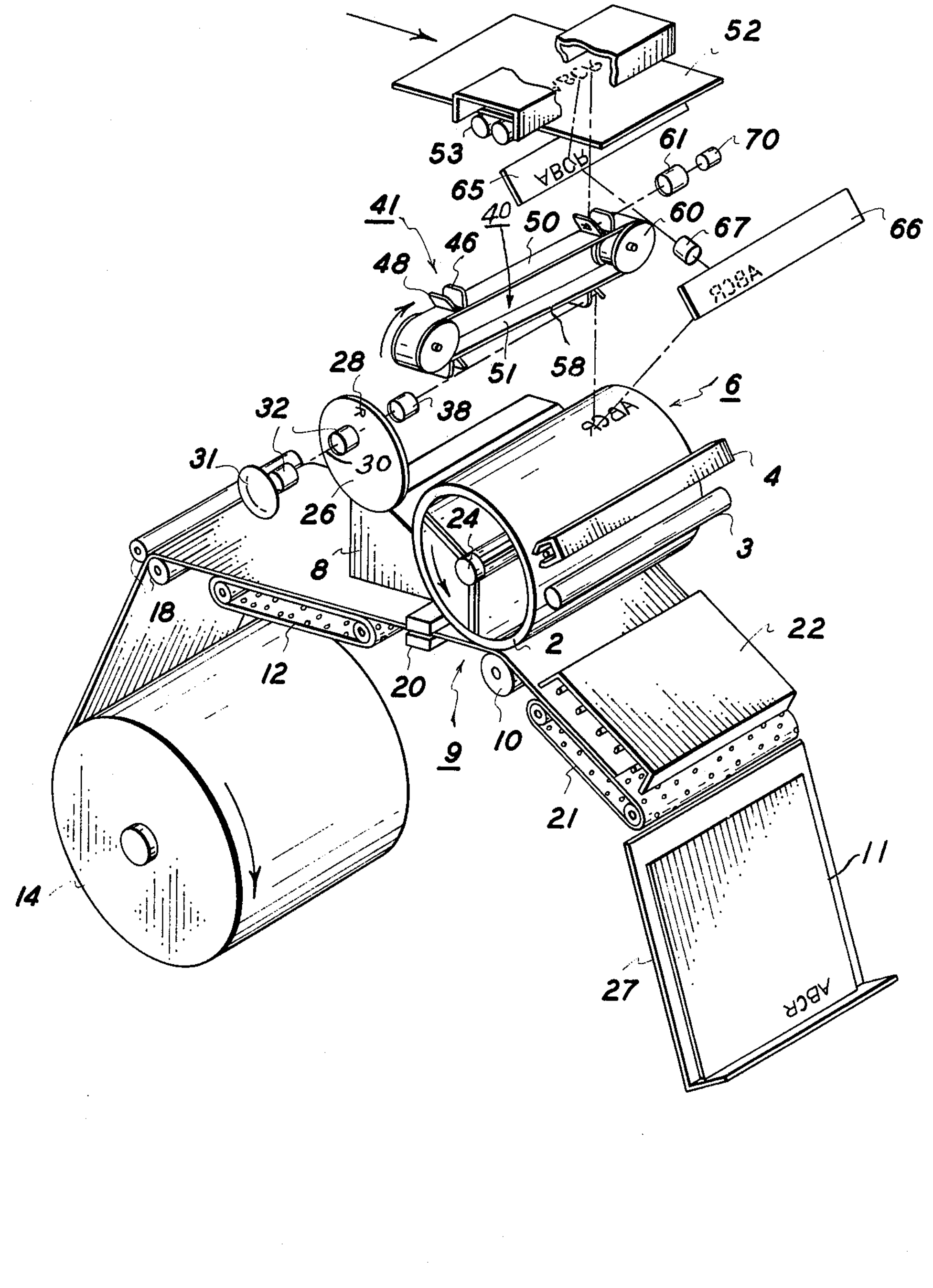
52
53
65
ABCR
61
70
41
40
50
46
48
60
67
66
51
58
28
6
32
38
31
30
26
4
24
3
8
18
12
20
2
22
10
9
21
14
11
27
ABCR

SCANNING ARRANGEMENT FOR MULTI-FUNCTION OPERATION

BACKGROUND OF THE INVENTION

This invention is directed generally to facsimile and copier machines and, more specifically, to a single machine capable of operating selectively in one of various modes. Prior art machines exist which are capable of producing copies of documents by projecting images of the document onto a photosensitive medium which image is subsequently developed to render it visible.

Likewise, facsimile machines are known which optically scan a document to generate an electrical signal for remote transmission and receive similarily generated signals and respond thereto to generate a copy on a recording medium.

The prior art, however, does not teach a machine capable of operating in copier, facsimile-transmitter and facsimile-receiver modes alternately which utilizes a rotating optical disc containing characters thereon through which light pulses are projected onto a photosensitive medium via an endless belt scanning arrangement, a portion of the same scanning arrangement being used to optically scan a document to generate an electrical signal representative of information thereon.

OBJECTS AND SUMMARY

It is therefore an object of the invention to provide a machine capable of operating in various modes and using common components to perform multiple functions.

It is a further object to provide a scanning arrangement for use in a facsimile transceiver for scanning a light beam across a document to be transmitted in a facsimile transmitter mode for generating an information representative electrical signal for remote transmission, and for scanning a train of light pulses which are directed through a controlled optical disc to generate an information containing image on a photosensitive medium in a facsimile receiver mode.

A further object is to provide a scanning arrangement with the above-noted features which is simple in design and inexpensive to manufacture.

These and other objects are accomplished by means of a scanning arrangement which includes a plurality of lens-mirror combinations mounted on an endless belt. A drive means is provided for rotating the belt continuously. A rotatable disc character generator, such as described in detail in U.S. Pat. No. 3,695,161, is arranged with special characters and light pulses are selectively passed therethrough and scanned by the lens-mirror combinations situated on the lower run of the endless belt in the facsimile receiver mode. In the facsimile transmitter mode, a light flooded document is incrementally scanned by means of the lens-mirror combinations on the top run of the belt, the resulting optical signal being directed to photocell to generate an electrical signal for remote transmission.

IN THE DRAWINGS

FIG. 1 is a diagrammatic perspective view of the multifunction machine including the scanning arrangement of the invention.

DETAILED DESCRIPTION OF THE INVENTION

Reference will now be made to the drawing which depicts illustratively in more detail the significant portions of the scanning arrangement of the invention.

The invention is contemplated for use in conjunction with a xerographic processor which is conventional in nature and the drawing shows exemplary process stations for such a processor. While the xerographic process itself does not form a part of the present invention, it is illustrated to provide a point of reference for this invention in a practical environment.

Basically, a conventional xerographic drum 2 is shown as being rotatable in the direction indicated by the arrow. Circumferential portions of the drum 2 pass successively a preexposure discharge station comprising the discharge lamp 3 and a preexposure charging station including a corotron 4. Next, the drum passes an exposure station 6 where the previously charged xerographic drum 2 is selectively discharged in accordance with the intensity of the image projected thereon. The latent electrostatic image thereby produced may then be conventionally developed at a developing station 8 by means of conventional developing apparatus, such as by cascading electroscopic marking particles over the latent electrostatic image.

The developed latent image is then moved to a transfer station 9 where an electrically biased transfer roll 10 transfers the electroscopic marking particles from the drum 2 onto a copy sheet 11 which is carried on copy sheet conveyors 12. The copy sheet 11 is part of a copy sheet roll 14 which is unwound under the influence of the driven feed-out roller set 18 and is cut to an appropriate length by means of a cutter 20. After transfer a conventional radiant fuser 22 may be employed to permanently affix the transferred image onto the copy sheet after which the sheets are delivered to the collection tray 22. The xerographic drum 2 is driven by motive power applied to its shaft 24.

As noted above, the xerographic aspects of the present disclosure do not constitute a portion of the inventive concept herein disclosed. For example, any photoresponsive medium may be used to receive and record the optical projections. Therefore, the xerographic drum may be replaced by a suitable photographic medium or any other light responsive medium. It goes without saying that in certain situations depending upon the type of recording medium utilized a drum configuration is not necessarily desirable and a flat plate adapted for movement may be employed.

The source of the optical projections which are received by the xerographic drum 2 in the facsimile receiver mode of operation, comprises an arc lamp flash source 31 and a pattern disc 26 which is continuously rotated so as to pass annular pattern areas 28 successively through an exposure zone. These pattern areas 28 are composed of sets of transparent light modulating patterns capable of optical projection. The exposure zone is aligned with the center line of the image path designated in the drawing by reference numeral 30. Light pulses generated by the source 31 are first focused by lens 32 onto the appropriate pattern of the disc 26. The light is then collimated by the lens 38 and directed toward a scanning arrangement 40. As noted hereinbefore, the details of construction of the projection system, including the electronic circuitry required to generate a pulse from source 31 at the precise moment a selected pattern area 28 passes into the exposure zone is described in greater detail in U.S. Pat. No. 3,695,161. This patent also describes an arrangement for achieving uniform spacing of the characters projected onto the drum 2, which arrangement may also be employed.

For moving the image bearing light pulses from source 31 across the photosensitive drum 2 there is provided a scanning arrangement 40 comprising a plurality of lens-mirror combinations 41, each combination consisting of a lens 46 and a mirror 48 formed into an integral unit by an appropriate support member (not shown). This support member is, in addition, attached to a flexible, endless drive member 58, which may be a belt, as illustrated in the drawing. The belt 58 is mounted on two rollers 60, one of which may be driven by a suitable source of motive power (not shown) to move the belt 58 in the direction shown. The belt is arranged to define a top run 50 and a bottom run 51, each run having at any given moment a plurality of lens-mirror combinations 41 associated therewith.

Further details of the scanning arrangement may be had by reference to the aforementioned patent.

A brief description of the operation of the projection system is as follows: As the disc 26 revolves continuously, each of the pattern areas 28 passes through the exposure zone. Electronic circuitry, not shown but described in the aforementioned patent, is provided which generates a signal identifying the pattern area in the exposure zone at any given instant. Other electronic circuitry is operative to receive an electrical signal identifying a particular character to be printed. The circuitry, utilizing these two electrical signal inputs, generates a control signal to flash the source 31 at the precise moment a selected pattern area 28 passes through the exposure zone. The selected pattern areas 28 of disc 26 are then imaged at infinity by the collimating action of lens 38. This collimated light impinges on lens 46 which images that selected character via mirror 48 onto the image plane at the surface of the drum 2 or other photoreceptor.

In the facsimile transmitter mode of the invention, an information containing document 52 is scanned to generate an electrical signal corresponding to amplitude variations in light directed through successive elemental areas of the document. The document 52 may be supported in conventional fashion on a transparent platen (not shown) with appropriate means being provided to move the document in the direction shown by the arrow. The particular speed at which the document is moved is determined by the rate at which the scanning arrangement 40 can scan one line of information. The document 52 may be moved continuously, or intermittently, after each scan line is completed. Flood lights 53 are provided below the document 52 to illuminate a section thereof being scanned by the top run 50 of the scanning belt.

Scanning of the document 52 is accomplished by the lens-mirror combinations 41 on the top run of the scanning belt 58. In the view shown, the lens-mirror combination located in the leftmost portion of the top run 50 is about to begin a new scan line, while the lens-mirror combination near the rightmost section of the top run 50 is about to complete a scan line. The combinations 41 are mounted at equidistant points on the endless belt 58 at intervals substantially equal to the width of the copy document 52. The top run 50 of the belt extends in a plane approximately parallel to the plane occupied by the surface of the document 52.

A photocell 70 is arranged in the path of the light reflected from the lens-mirror combinations 41 at the top run 50 of the scanning belt, in front of which is located a lens 61 to focus light thereon. The photocell 70 converts the amplitude variations of the light impinging thereon into an electrical signal suitable for transmission to a remote point.

In operation, in the facsimile transmitter mode, as successive lens-mirror combinations traverse the top run of the scanning belt, adjacent lines of information on document 52 are scanned. In particular, each lens-mirror combination collects light directed through adjacent elemental areas on a scan line of the document, which light varies in amplitude in correspondence with the information being scanned, and directs the light via mirror 48 and lens 46 to the photocell 70 via lens 61. It can be seen that as the document 52 is moved in the direction of the arrow, the entire document is scanned in this fashion.

A further provision of the invention is first and second copy mirrors 65 and 66, and a copy lens 67 located therebetween for focusing light from document 52 onto the photosensitive drum 2, in a copier mode. Any conventional optical system suitable for this purpose may be employed depending on the constraints of space in the particular machine. Xerographic lens systems of a suitable type for this purpose are well known in the art, the only requirement being that the components of the copier lens system not interfere with the scanning arrangement described above.

While the invention has been described with reference to a preferred embodiment, it will be understood by those skilled in the art that various changes may be made and equivalents may be substituted for elements thereof without departing from the true spirit and scope of the invention.

What is claimed is:

1. A multi-function apparatus capable of copying documents onto a recording medium, generating information onto a recording medium in accordance to pulsating signals, and for scanning a document in a facsimile transmitter mode, said apparatus comprising: a recording medium, means for providing a pulsating beam, a document station, light means separate from said beam for illuminating said document station, and a photosensor, scanning means located in the path of said pulsating beam to scan said beam across said recording medium, said scanning means also being located in the path of light reflected from said document station to scan successive portions of information at said document station to said photosensor, and means for imaging information illuminated by said light means at said document station to said recording medium.

2. The structure as recited in claim 1 wherein said scanning means comprises an endless member having a plurality of reflecting members thereon, means for continuously moving said endless member, said endless member being so positioned that when one of said reflecting members is in one position, it will reflect said beam to said recording medium and when in another position, will reflect light from said document station to said photosensor.

3. The structure as recited in claim 2 wherein an optical disc is located intermediate said means for providing a pulsating beam and said scanning means, said disc including a plurality of light transmissive patterns to be imaged onto said medium.

* * * * *